June 9, 1925.
J. W. SHEPARD
1,541,595
VALVE GEAR MECHANISM
Filed April 1, 1921   3 Sheets-Sheet 1
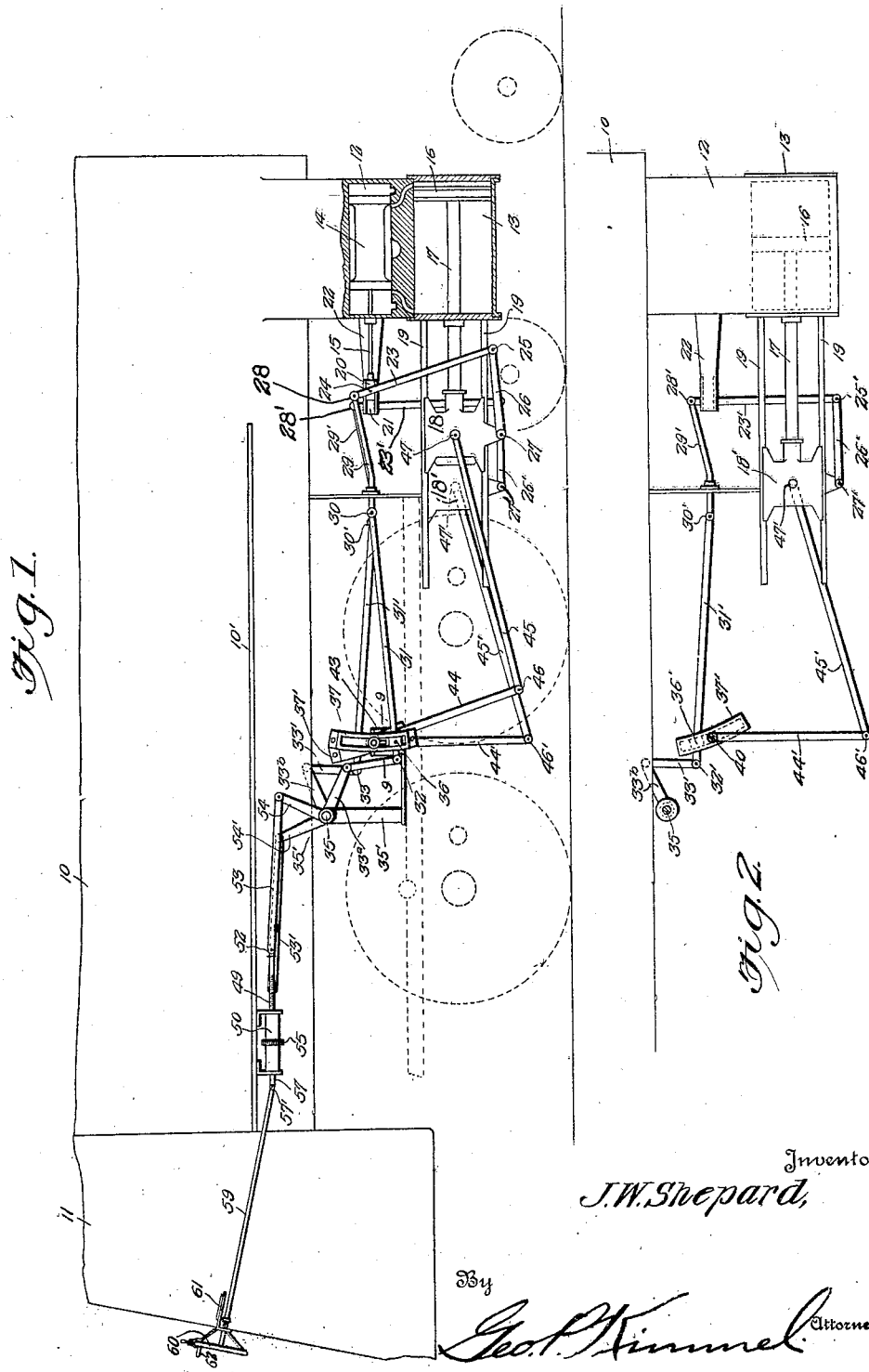
Inventor
J. W. Shepard,
By
Geo. P. Kimmel, Attorney June 9, 1925. 1,541,595
J. W. SHEPARD
VALVE GEAR MECHANISM
Filed April 1, 1921 3 Sheets-Sheet 2
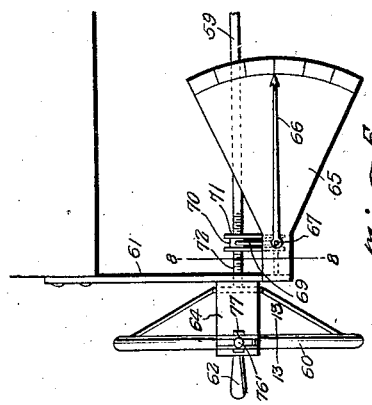
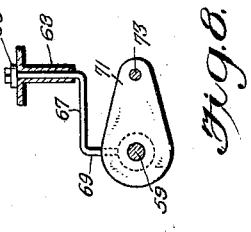
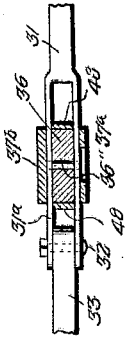
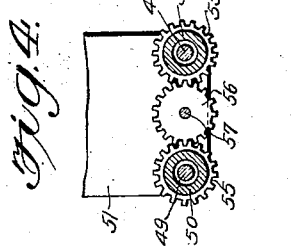
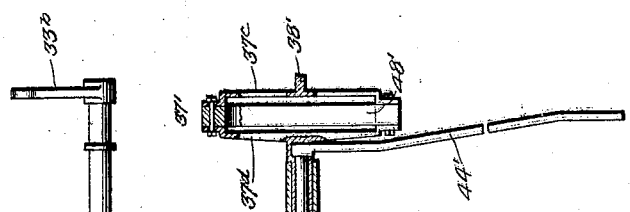
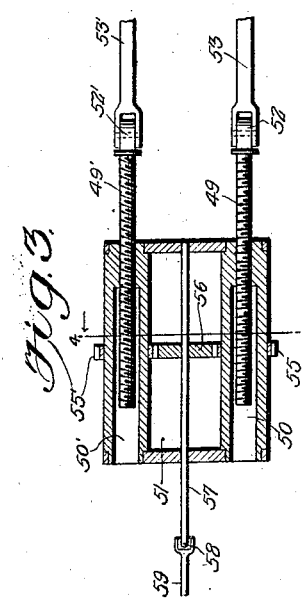
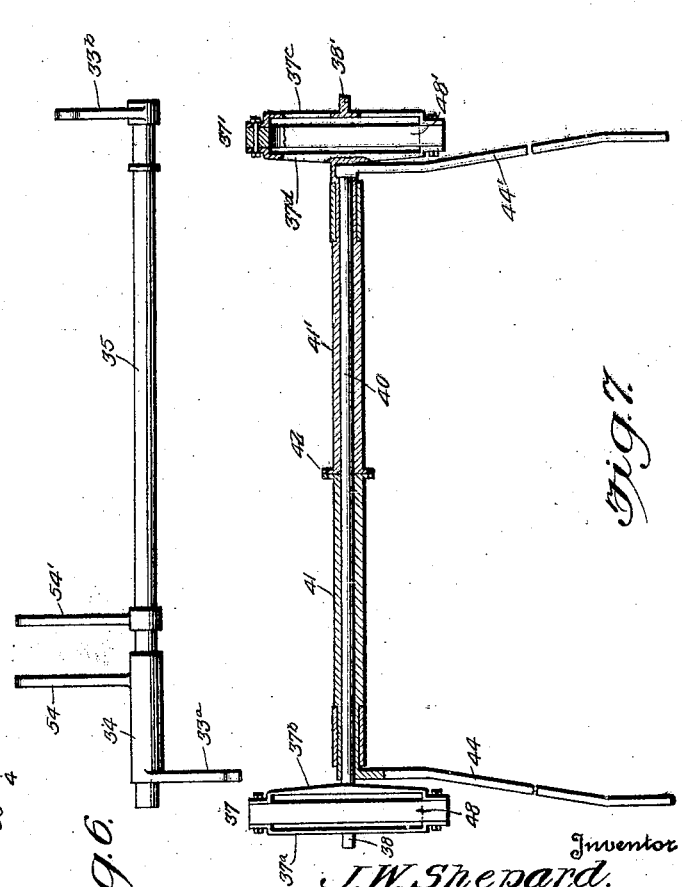
Inventor
J. W. Shepard,
By
Geo. F. Kimmel Attorney

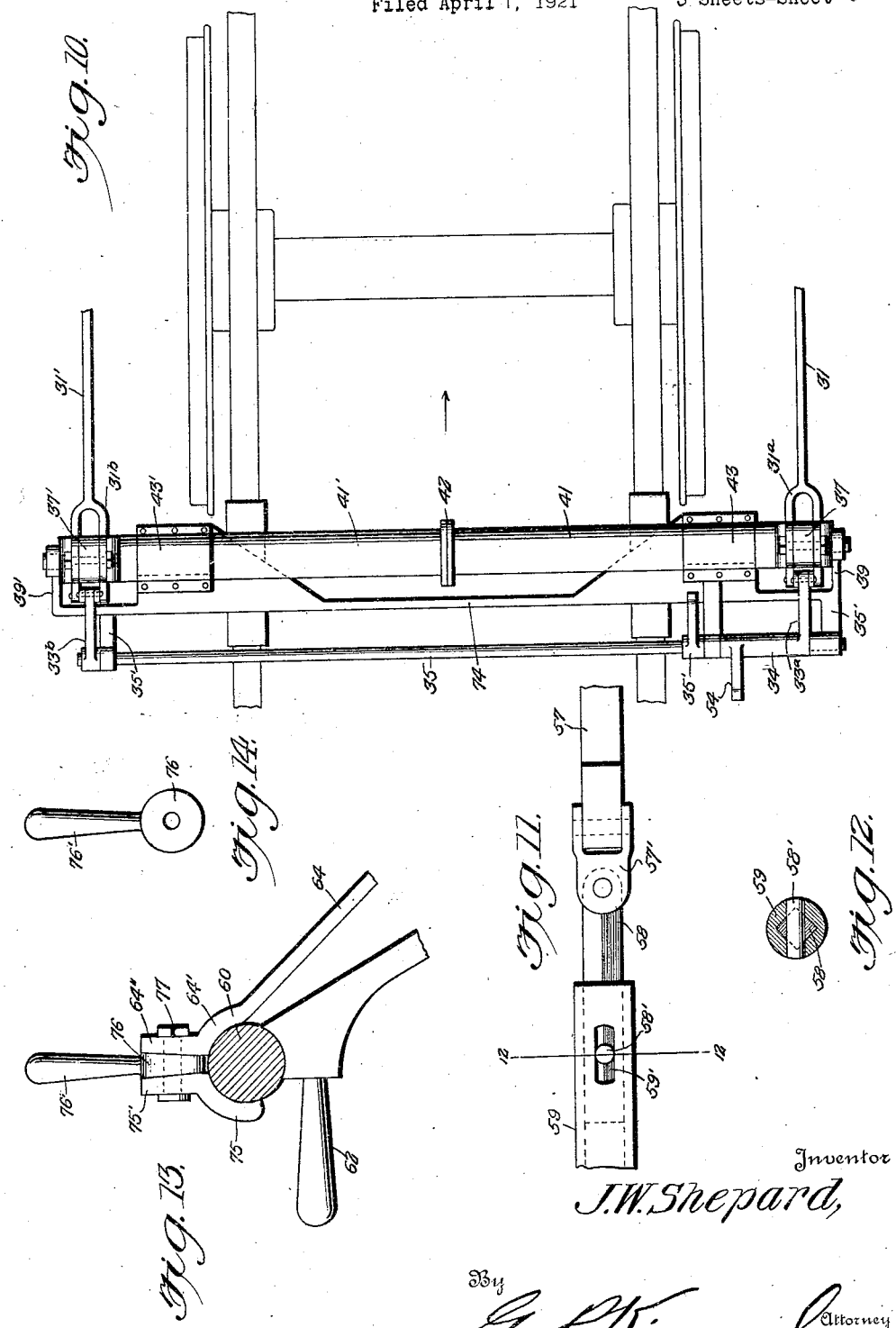

Patented June 9, 1925.

1,541,595

UNITED STATES PATENT OFFICE.

JOHN W. SHEPARD, OF TUCSON, ARIZONA.

VALVE-GEAR MECHANISM.

Application filed April 1, 1921. Serial No. 457,598.

*To all whom it may concern:*

Be it known that I, JOHN W. SHEPARD, a citizen of the United States, residing at Tucson, in the county of Pima and State of Arizona, have invented certain new and useful Improvements in Valve-Gear Mechanisms, of which the following is a specification.

The invention relates to improvements in valve gear mechanisms generally, and more particularly to a type of the same adapted for use on locomotives.

The principal object of the invention is to provide for a mechanism of the character mentioned, and one of an improved construction and arrangement whereby to facilitate a more timely and economical distribution of the steam to the cylinders of a locomotive.

Another important object of the invention is to provide for a mechanism of the class described, and one so arranged and connected as to avoid all connections to crank pins and axles of the locomotive whereby to make possible a more perfect balance of the wheels on which such parts have heretofore been carried.

A further and equally important object of the invention is to provide a mechanism of the kind set forth, and one, in the use of which, a more adequate and systematic means of control and operation will be effected from the engineer's position in the cab of the locomotive.

A still further object of the invention is to provide a valve gear mechanism wherein the weight of the several parts of the same is materially reduced with a corresponding reduction and saving in the amount of space necessary for its installation as a whole, and especially that portion thereof to be located in the cab of a locomotive, as well as effecting an appreciable reduction and saving in the cost of manufacture.

Another object of the invention is to provide a valve gear mechanism of a refined construction involving a marked reduction in the number of parts and in the number of connections between the parts, such as will effect a corresponding reduction in the amount of friction developed during the operation of the mechanism, and, consequently, in the amount of power necessary for such operation thereof.

A more remote but equally important object of the invention is to provide for a mechanism of this particular type wherein the reversing means per se is of a construction providing for a more steady operation of the parts thereof, and which is so arranged and connected, one part with another, that no appreciable amount of the vibration of the moving parts is transmitted to the control means of the same located within the cab of the locomotive.

A still further object of the invention is to provide a mechanism of the character mentioned, and one which admits of as great a valve travel as may be desired, and which delivers maximum opening of the valve on one side from the intermediate portion of the piston action by transferring the same from the opposite cylinder or engine, the dormant portion of the cycle of action to occur with the expansion period of the opposite cylinder or engine of the locomotive.

With the foregoing and other objects in view, the invention resides in the certain novel and useful construction and arrangement of parts as will be hereinafter more fully described, set forth in the appended claims, and illustrated in the accompanying drawings, in which:—

Figure 1 is a right fragmentary side elevation of a conventional form of locomotive embodying the invention, Fig. 2 is a view similar to Fig. 1 showing the left mechanism from the inside, Fig. 3 is a detailed sectional view of the means for effecting a reverse operation of the mechanism, Fig. 4 is a transverse section taken on the line 4—4 of Fig. 3 and showing the gears of the reversing mechanism, Fig. 5 is a detail of the operating and indicating means associated with the valve gear mechanism, Fig. 6 is a detail of the valve gear reversing shaft, Fig. 7 is a detailed assembly of the built-up concentric link shaft, Fig. 8 is a detail of a micrometer device associated with the operating means and indicator, the same being a section taken on line 8—8 of Fig. 5, Fig. 9 is a sectional detail taken on the line 9—9 of Fig. 1.

Fig. 10 is a fragmentary plan view of an intermediate portion of a locomotive showing the manner of mounting of the concentric link shaft and the reversing shaft and their corelated parts thereon, Fig. 11 is an enlarged fragmentary detail showing the coupling connection between the adjacent ends of the reach rod and the operating shaft proper of the reversing mechanism, Fig. 12 is a sectional view taken on the line 12—12 of Fig. 11, Fig. 13 is a sectional view taken on the line 13—13 of Fig. 5, and, Fig. 14 is a side elevation of one face of the cam lever for actuating the locking means for the operating hand wheel of the mechanism.

Referring to the drawings, wherein similar characters of reference designate corresponding parts in the several views thereof, the numeral 10 indicates generally the body portion of a locomotive, 11 the cab portion thereof, 12 the steam chest, and 13 the steam cylinder, the steam chest 12 having longitudinally movable therein the usual admission piston valve 14 operable through the medium of a valve rod 15, while the steam cylinder 13 has longitudinally movable therein the power piston 16 carried on the piston rod 17, which has its outer and opposite ends secured in the cross head 18, which is arranged to reciprocate in the cross head guide 19. The valve piston 14 controls the usual steam ports and passages leading into the steam cylinder 13 from the steam chest 12, and the rod 15 has its outer end engaged in a cross head 20 suitably mounted in its complemental guideway 21, which is secured to or formed with an arm 22 projecting outwardly from the end of the steam chest 12 for such purpose.

Duplicated at opposite sides of the locomotive is a valve link and lever mechanism, and each consisting of a lever 23—23' pivotally connected adjacent its upper end, as at 24—24', to the piston valve cross head 20—20', with its lower end pivotally connected, as at 25—25', to one end of the union link 26—26' which has its other end pivotally connected, as at 27—27', to the main driven cross head 18—18'. The upper end of the lever 23—23' is pivotally connected, as at 28—28', to one end of a link 29—29', which, in turn, has its opposite end pivotally connected, as at 30—30', to one end of a radius bar 31—31'. The radius bar 31—31' has its opposite end pivotally connected, as at 32—32', to a short link 33—33', which, in turn, is pivotally connected to crank arms 33ᵃ—33ᵇ. The crank arm 33ᵃ is formed with outer end of a sleeve 34, which is mounted on one end of a reversing shaft 35, while the crank arm 33ᵇ is secured directly to and on the opposite end of the shaft so that independent movement will obtain between the sleeve 34 and the shaft 35. The reversing shaft 35 is disposed transversely of the locomotive and is suitably journalled in bracket arms 35' projecting laterally at one side of a main supporting bracket 74 which is secured directly to and upon the upper faces of the usual frame elements at opposite sides of the locomotive, two of the bracket arms 35' being disposed at the opposite ends of the bracket 74 and journalling therein the complemental ends of the shaft 35, and one bracket arm 35' journalling the same at a point inward from one end and immediately adjacent the inner end of the sleeve 34. The radius rods 31—31' are each pivotally connected to sliding blocks 36—36', respectively, at points immediately adjacent their pivoted ends 32—32', and these blocks 36—36' are slidable in slotted yokes or links 37—37', respectively. The yokes or links 37—37' are each formed of separate parts 37ᵃ—37ᵇ and 37ᶜ—37ᵈ, respectively, the outer parts 37ᵃ—37ᶜ thereof being formed with spindles 38—38' which are journalled respectively in bracket arms 39—39' also formed with and at opposite ends of the main supporting bracket 74. The inner part 37ᵇ of the yoke or link 37 is secured directly to one end of a link shaft 40 which extends transversely of the locomotive, while the part 37ᵈ of the yoke or link 37' is secured to the end of a sleeve, which encircles the link shaft 40, and at the end of the latter opposite to the position of the yoke 37. This sleeve is formed to provide two sections 41—41' suitably joined or secured together, as at 42, so as to facilitate the assembling of the parts in position. The outer ends of the sleeve sections 41—41' are preferably of reduced diameter so as to form annular bearing surfaces whereby the same, together with the link shaft 40, are journalled in bearings 43—43' frame inward of the opposite ends of the main supporting bracket 74 in line with the bracket arms 39—39' thereof. Secured to the outer end of the sleeve section 41 is a crank arm 44, which has its free arm pivotally connecting at one end of the rod or bar 45, as at 46, which, in turn, has its outer end pivotally connecting the cross head 18, as at 47, and to the outer opposite end of the link shaft 40 is secured a similar crank arm 44' which has its free end pivotally connected at one end of the rod or bar 45', as at 46', which, in turn, has its outer end pivotally connecting the cross head 18', as at 47'. The sections 37ª—37ᵇ and 37ᶜ—37ᵈ of the yokes or links 37—37', are each coupled together with interposed members 48—48', respectively by means of bolts at the upper and lower ends thereof, as shown in Fig. 7, and through the slots provided at the opposite sides of these members 48—48' are slidably engaged the opposite ends of the forked or yoked ends 31ª—31ᵇ of the radius rods 31—31', respectively, the links 33—33' being pivoted as at 32—32' in the open projected ends of the forked ends 31ª—31ᵇ substantially as shown in Fig. 9 of the drawing, the pivot pin connecting the radius rods of the sliding blocks 36—36' being designated as in 36''. The foregoing described mechanism comprises the valve gear proper in its entirety.

The control mechanism for the valve gear mechanism, as aforesaid, comprises a pair of screw-threaded reversing shafts 49—49' operable in complementally arranged cylinders 50—50' which are preferably journalled in a housing, designated generally as at 51, and disposed in parallel relation so that the free unthreaded ends of the shafts 49—49' may be pivotally connected, as at 52—52', to one end of the rods 53—53', which in turn have their opposite ends respectively connecting pivotally one to the free end of the crank arm or lever 54, formed with the sleeve 34, and the other to the free end of a crank arm 54', which is secured directly to the reversing shaft 35. Formed or otherwise secured medially of the length of the cylinders 50—50' are annular gears 55—55', respectively, which are arranged in mesh with the gear 56 which is interposed between the same medially of the housing, and which is secured on an operating shaft 57 journalled in the opposite end walls of the latter, and has one end projecting outwardly therefrom. The housing 51 is suitably secured in proper position, as on the under side of the running board 10' of the locomotive. The free end of the operating shaft 57 has pivoted thereon a coupling or knuckle 57' which, in turn, pivotally connects one end of a short rod section 58, the axis of the latter pivot being disposed at right angles to the first mentioned pivot. The rod section 58 is preferably square in cross-section and has its unpivoted end portion slidably engaged in a squared bore or socket formed in the adjacent end of a reach rod 59, and to prevent the accidental disengagement of the parts, a stop pin 58' is passed through the engaged end of the rod section 58 and has its oppositely projected ends engaged in aligned slots 59' opening through the walls of the squared bore or socket of the reach rod. This relative movement, permissible through the medium of the pin and slot connection, is provided to accommodate whatever expansion and contraction that may occur in the reach rod 59, which, in some instances, may be quite lengthy and is subjected to varying temperatures by reason of its proximity to the boiler of the locomotive. The reach rod 59 extends rearwardly from its connection with the knuckle 57' and projects into the cab of the locomotive to a point adjacent the engineer's position therein, and has its inner end portion journalled in a bracket 61 which is secured in proper position for the purpose from the adjacent boiler end. Mounted on the free inner end of the reach rod 59 is a hand wheel 60 having a handle 62 for facilitating the turning movements of the same for the rotation of the reach rod 59 and the consequent operation of the valve gear mechanism. Associated with the hand wheel 60 is a locking device which is in the nature of a clamping means operable for engagement with the annular rim portion thereof whereby to effectively hold the wheel in any of its positions of operation, which locking device consists of a fixed bracket member 64 having its intermediate free end portion 64' shaped to conform to the curvature of an adjacent portion of the rim of the hand wheel 60 and to provide an angularly disposed free end portion 64'' extending radially of the rim. A removable clamping member is associated with the similarly formed portion of the member 64, and the same has a portion 75 shaped to engage the portion of the wheel rim 60 at a point opposite to that engaged by the corresponding portion 64' and an extended portion 75' projecting radially of the rim in alignment with the extended end portion 64'' and 75'. The clamping members are oppositely inclined and operable between these inclined faces is cam or wedge-shaped portion 76 of a hand lever 76', a pivot pin or bolt 77 being passed through the extended portions and the cam portion 76 for securing the parts together. When the hand lever 76' is in its vertical, or radial position with respect to the wheel rim 60, the clamp portion 75 is shifted into engagement with the latter, and by turning the lever out of the vertical, or to a position tangentially of the circumference of the wheel rim, this clamp portion is moved from locking engagement therewith. When the lever 76' is shifted to vertical position it functions to securely retain the wheel in desired position.

Associated with the operating mechanism and operable therefrom is an indicating device which is arranged in the cab in plain view and the same consists of a dial 65 marked to show all points of gear from zero per cent, to 100 per cent forward and backward motion. The dial is preferably of segmental form, having the zero or out-of-gear point of indication medially of the arc or curvature thereof, and normally registering with the zero point is an indicating pointer 66 which is pivotally supported in position at the base of the dial and is movable over the latter by means of a crank arm 67, to which it is fastened, and which is journaled in a bearing 68 formed rearwardly of the base of the dial. The free angularly bent arm 69 of the crank arm 67 is supported in a groove 70 formed in an end space of a micrometer member or nut 71, which is movable, in either a forward or backward direction, correspondingly with the movement of the operating mechanism, on a threaded portion 72 formed with the operating rod 59, as is shown in Fig. 5. The micrometer member or nut 71, is elongated, or otherwise of substantially egg or pear configuration, as shown in Fig. 8, and has its extended portion formed with an aperture engaged on a guide rod 73, whereby it is maintained in accurate position at all times.

In the operation of the valve gear mechanism constructed and arranged in accordance with the invention as shown and described herein, the same being greatly simplified as will be obvious to those skilled in this particular art, the valve pistons in the steam chests of the locomotive are to be changed to a forward or reverse position from out of gear position, as is indicated on the dial 65 when the pointer 66 is at the zero indication thereon, by the release of the locking clamp 75 from engagement with the wheel rim 60, and turning the latter in the proper direction, as to the right for the forward position, or to the left for the reverse. The turning movement of the hand wheel 60 rotates the reach rod 59 and the operating shaft 57 and consequently the gear 56, which, in turn, rotates the gears 55—55' accordingly. The rotation of the gears 55—55' shortens one of the screw shafts 49—49' and lengthens the other outward of the housing 51, producing the desired effect of shifting the link block for the required direction of travel of the locomotive, and, upon rotating the parts in a reversed direction, the screw shafts 49—49' are again shortened and lengthened in the reversed order of their previous operation. With this arrangement, it is necessary to operate the valve pistons, one reversed to the other, by reason of the positions of the locomotive cranks, the same being ninety (90) and two hundred and seventy (270) degrees apart. It is contemplated to have the gear ratio of the gear and screw shaft mechanism designed for high speed or for relative fast movement whereby the time required to effect the reversing of a locomotive is reduced to a minimum.

It is to be here noted, however, that for maximum valve travel approximately thirty (30) per cent of the valve motion is obtained by reason of the link connection 26 between the cross head 18 and the valve lever 23 on the immediate side of the locomotive, while the remaining seventy (70) percent is derived through the oscillation of the link connection 45' on the opposite side of the locomotive. It is also to be here noted that the lead of the valves 14 occurs shortly before arrival at or on dead center, while maximum opening of the same occurs shortly after passing dead center, the degree of such maximum opening depends upon the valve travel and is to be determined or controlled by the operator. In any of its several positions of operation, the hand wheel 60 is to be locked by the proper manipulation of the locking device hereinbefore described, the latter being adapted for engagement with the rim thereof at any point of the circumference of the same.

The mechanism as hereinbefore specifically described is particularly adapted for the long coupled types of locomotives, but the same can be readily installed on shorter coupled locomotives by merely lessening the length of the radius rods 31—31' to a desired degree, and, if necessary for the purpose, combining the rods 31—31' and links 29—29' into single rods of the desired length, thus dispensing with the pivotal connections 30—30' therebetween.

It is to be understod that various changes in the detailed construction and arrangement of the parts of the control mechanism and valve gear may be resorted to for the accomplishment of the desired purpose as set forth herein without departing from the spirit and scope of the invention.

Having thus fully described the invention, what is claimed, is:—

In a locomotive the combination with the valve cross heads and piston cross heads on the opposite sides of the locomotive, a transversely extending rock shaft formed of a pair of sections, one arranged within the other, each projecting from the other and from opposite sides of the locomotive and each having a slotted link at its outer end and a crank arm depending from its inner end and providing means whereby the valve motion on one side is partially derived from the opposite side of the locomotive, of a valved gear mechanism mounted on each side of the locomotive and consisting of a link pivotally connected to a piston cross head centrally of its bottom and extending forwardly therefrom, an upstanding lever pivoted at its lower end to the forward end of said link and further pivoted in proximity to the outer side of and extending above a valve cross head, a rod having its forward end pivotally connected centrally of the outer side of said piston cross head and extending rearwardly therefrom and connected to the crank arm of one of said shaft sections, a rearwardly extending link having its forward end pivoted to the upper end of said lever and a radius bar slidably connected with the link of the other shaft section and having its forward end pivotally connected to the rear end of the link which projects from said lever, and means connected with the shaft sections for effecting the shifting thereof to provide for the forward and backward movements of the engine.

In testimony whereof, I hereto affix my signature.

JOHN W. SHEPARD.